(12) United States Patent
Höfflinger et al.

(10) Patent No.: US 7,224,848 B2
(45) Date of Patent: May 29, 2007

(54) METHOD AND ARRANGEMENT FOR FPN CORRECTION IN AN IMAGE SIGNAL FROM AN IMAGE SENSOR

(75) Inventors: Bernd Höfflinger, Sindelfingen (DE); Markus Strobel, Stuttgart (DE)

(73) Assignee: Institut für Mikroelektronik Stuttgart, Stuttgart (DE)

(*) Notice: Subject to any disclaimer, the term of this patent is extended or adjusted under 35 U.S.C. 154(b) by 238 days.

(21) Appl. No.: 10/959,027

(22) Filed: Oct. 5, 2004

(65) Prior Publication Data

US 2005/0117035 A1 Jun. 2, 2005

Related U.S. Application Data

(63) Continuation of application No. PCT/EP03/03660, filed on Apr. 9, 2003.

(30) Foreign Application Priority Data

Apr. 16, 2002 (DE) .................. 102 16 806

(51) Int. Cl.
*G06K 9/40* (2006.01)
(52) U.S. Cl. ............ 382/274; 382/260; 382/275; 358/3.26; 358/3.27
(58) Field of Classification Search ........... 382/260, 382/274, 275, 278; 358/3.26, 3.27
See application file for complete search history.

(56) References Cited

U.S. PATENT DOCUMENTS

| | | | |
|---|---|---|---|
| 4,680,723 A | 7/1987 | Whinray et al. | |
| 4,771,267 A | 9/1988 | Russell, Jr. et al. | |
| 5,631,466 A | 5/1997 | Botti et al. | |
| 6,075,903 A | 6/2000 | Breiter et al. | |
| 6,108,611 A | 8/2000 | McEwen | |
| 6,285,410 B1 * | 9/2001 | Marni | 348/576 |
| 6,587,142 B1 * | 7/2003 | Kozlowski et al. | 348/241 |
| 6,640,145 B2 * | 10/2003 | Hoffberg et al. | 700/83 |
| 6,741,725 B2 * | 5/2004 | Astle | 382/103 |

(Continued)

FOREIGN PATENT DOCUMENTS

DE    197 15 983 C1    9/1998

(Continued)

OTHER PUBLICATIONS

Werner Ogiers, Guy Meynants, Bart Dierickx, Robert Mertens; "An analogue-domain FPN compensation circuit for random access CMOS imagers"; Jun. 1997; pp. 381-387.

(Continued)

*Primary Examiner*—Jingge Wu
*Assistant Examiner*—Yosef Kassa
(74) *Attorney, Agent, or Firm*—Harness, Dickey & Pierce, P.L.C.

(57) ABSTRACT

In order to correct for fixed pattern noise in the signals of an image sensor, image signal values are read out from the pixels of the sensor. Individual correction values are added as analogue quantities to the image signal values via a signal path having a defined transfer function. Parameters which are characteristic of the defined transfer function are provided in a memory and the individual correction values are calculated in a correction value calculating unit using the parameters provided.

16 Claims, 3 Drawing Sheets

U.S. PATENT DOCUMENTS 6,859,565 B2 * 2/2005 Baron .................. 382/275

FOREIGN PATENT DOCUMENTS

| EP | 0 295 873 A3 | 12/1988 |
|----|--------------|---------|
| JP | 5-137073 | 6/1993 |
| WO | WO 97/40621 | 10/1997 |
| WO | WO 99/03262 | 1/1999 |

OTHER PUBLICATIONS

Arnulf Wallrabe; "Nachtsichttechnik"; Sep. 2004; pp. 343-345.
"Imager and Camera Data and Features"; Sep. 2000; pp. 1-25.

* cited by examiner

METHOD AND ARRANGEMENT FOR FPN CORRECTION IN AN IMAGE SIGNAL FROM AN IMAGE SENSOR

RELATED APPLICATIONS

This application is a continuation of international patent application PCT/EP03/03660 filed on Apr. 9, 2003 and published as WO 03/088649 in German language, which international patent application claims priority under the Paris Convention from German patent application DE 102 16 806.7 filed on Apr. 16, 2002.

BACKGROUND OF THE INVENTION

The present invention relates to a method and an arrangement for reducing of or correcting for fixed pattern noise (FPN) in the image signals from an image sensor having a plurality of pixels.

Modern image sensors for recording images have a plurality of individual pixels which are constructed from partially light-sensitive electronic components. The pixels generate, in dependence on the light impinging on them, analogue image signals having analogue image signal values at any instant in time. The analogue image signal values are converted into digital image signal values in a subsequent processing stage by means of an A/D converter. The digital image signal values of all pixels represent a digital image of the recorded scene which can later be reproduced on a monitor, a printer and the like.

A known problem in such image sensors is the fixed pattern noise (FPN). This is the name given to inhomogeneities in an image, which are mainly caused by production tolerances of the individual pixels. In the production of CMOS image sensors having a logarithmic characteristic, for example, variations with regard to the threshold voltages of the logarithmic transistors typically occur. When a recorded image is viewed, the fixed-pattern noise caused by such production tolerances shows up in areas which are actually uniform (homogeneous) but exhibit a pattern which is not present in reality.

To reduce or eliminate the fixed-pattern noise, it is known to add individual correction values to the image signal values from the individual pixels. By adding negative correction values, a subtraction in a mathematical sense can also be achieved. The goal of this measure is to equalize the differences existing between the image signal values of the individual pixels caused by production tolerances by adding suitable correction values. The correction values for the image signal value of each pixel can be taken from a memory. Such an FPN correction is known, for example, from JP 5-137073 A, where the image signal values which are already digitized are corrected in accordance with this document.

As will be acknowledged, the quality of the FPN correction decisively depends on the selection and determination of the individual correction values. The problem is, therefore, to determine individual correction values suitable for a particular image sensor. Prior to the present invention, the present assignee has proceeded as follows:

Firstly, a uniform (static) correction value was set for all pixels of the image sensor. Then a homogeneous reference image was recorded by means of the image sensor. A suitable reference image is, for example, a uniformly illuminated area (known from the so-called white calibration in cameras). Since the correction values of all pixels are identical in the recording of this reference image, the image signal values of the individual pixels exactly reflect the fixed-pattern noise in this case.

In the next step, a mean value over all pixels was formed from the recorded image signal values of the reference image. This mean value was then used as a basis for a uniform target image value for all pixels. To determine the suitable individual correction values for all pixels, all correction values from a set of possible correction values were tested in a test run for all pixels. In the case of correction values having a width of 8 bits, this required 256 loop iterations per pixel. As suitable individual correction value, the correction value with which the associated image signal value came closest to the uniform target image value was selected for each pixel.

The method represents a simple possibility for determining suitable individual correction values with low demands on the hardware used. The fixed-pattern noise can be reduced considerably by means of the correction values found in this manner.

However, carrying out this method requires a considerable processing time due to the numerous loop iterations. The larger the set of possible correction values, i.e. the data width of the individual correction values, the greater the processing time. Therefore, an improvement in the FPN correction by increasing the data width of the correction values leads to even very much longer processing times.

SUMMARY OF THE INVENTION

It is one object of the present invention to specify an alternative method and a corresponding arrangement for providing accurate and fast FPN correction.

According to one aspect, this object is achieved by means of a method comprising the steps of reading the image signal values out of the pixels, and adding individual correction values to the image signal values, wherein the correction values are added to the image signal values as analogue quantities via a signal path having a defined transfer function, wherein parameters which are characteristic of the defined transfer function are provided in a memory and wherein the individual correction values are calculated at least once in a correction value calculating unit using the parameters provided.

According to another aspect, the object is achieved by means of an arrangement comprising a device for reading the image signal values from the pixels, comprising a first memory for storing individual correction values, and comprising an adder for analogue addition of the individual correction values to the image signal values, the first memory and the adder being connected via a signal path having a defined transfer function, further comprising a second memory and a correction value calculating unit, wherein the second memory is configured to provide parameters which are characteristic of the defined transfer function, and wherein the correction value calculating unit is configured to calculate the individual correction values using the parameters provided.

The novel method and the arrangement are based on a calculation of the correction values in the mathematical sense whereas the correction values in the previous method were more determined by a search process. However, the novel procedure initially requires to determine, at least in approximation, the transfer function according to which the correction values are influenced when they are fed into the correction value signal path. This measure is not required in the approach previously practiced. Surprisingly, it has been found that the associated expenditure is compensated for by the accuracy and speed of the novel method which can be achieved. This applies, in particular, if the FPN correction is performed repeatedly for an image sensor, for example in order to achieve an optimum adaptation to new environmental conditions. In such a case, the parameters which characterize the defined transfer function do not necessarily have to be redefined so that the corresponding additional expenditure occurs only once in this case. In addition, the novel method allows an iterative application so that negative influences due to an inaccurate parameter determination and/or due to dynamic effects during the setting of the correction values can be reduced very successfully. This also makes it possible to achieve an improvement in the quality of the correction.

In addition, the speed at which the individual correction values are determined depends very much less on the data width of the correction values used in the novel method. An increase in the data width for further improvement of the correction quality, therefore, results in a lesser increase in the method duration than in the approach previously used. Assuming a correction value width of 8 bits and dispensing with iterative loop iterations, the novel method provides an increase in speed by a factor of up to 256 since the individual correction values are determined directly by the analytical calculation.

The 256 loop iterations hitherto required with a correction value width of 8 bits and by means of which the best correction value was sought are no longer required here. Although the speed advantage is slightly reduced by the additional determination of the parameters of the transfer function, a speed advantage surprisingly remains even under unfavorable conditions. Once the parameters are available, the speed advantage becomes fully effective.

As will be discussed in the text which follows, simple approaches have been found for determining suitable parameters of the transfer function for a particular image sensor. Overall, the novel method and arrangement adapted to it therefore provide for a fast determination of the correction values, with speed advantages compared to the previous method being maintained even with an increase in the correction quality. The above-mentioned object has, therefore, been completely achieved.

In a refinement, at least two different correction values from a set of possible correction values are added to a constant image signal value, and for each of these correction values, a corrected image signal value is recorded, for determining the parameters. In this case, the image signal value at complete darkness or at an homogeneous illumination is preferably used as the constant image signal value.

In this embodiment, the transfer function to which the individual correction values are subjected is some sort of measured. Various correction values are set and then the result for each of the correction values is recorded at the output. The transfer function recorded in this manner includes not only the path of the correction values up to the adder but also the subsequent signal path along which the correction values pass together with the image signal values. As has been found, however, this does not represent a disadvantage. Quite the contrary, in this refinement, the functional relationships to which the correction values are subjected during the signal processing for the determination can be determined very simply and with adequate accuracy. In the simplest case, it is sufficient to determine two different correction values and the associated two corrected image signal values so that the transfer function can subsequently be approximated by a straight line. The associated inaccuracies are balanced by an enormous speed advantage in the determination of the transfer function. Higher accuracies in the determination of the transfer function can be achieved if the transfer function is measured at more than only two points. In the simplest case, the applied correction values and the associated output values in each case can be stored as parameters of the transfer function in a table. The measured function values are then nodes of the actual transfer function. If, in contrast, a linear approximation of the transfer function is deemed to be sufficient, it suffices to calculate the slope of the approximation line and store this as parameter in the memory. In this case, the memory can also be a register of an existing microcontroller.

In a further refinement, all correction values from the set of possible correction values are added to the constant image signal value.

In this embodiment, the transfer function is measured completely which represents the most accurate method of determination. As already mentioned, all applied correction values with their associated output values can then be stored as parameters of the transfer function in a table. The transfer function is represented as a table in this case. The correction value calculating unit can access the table and thus determine the suitable individual correction values in a very simple manner.

In a further refinement, the parameters are determined by means of selected pixels, preferably by means of a single pixel.

As an alternative to this, it is also possible to determine the parameters of the transfer function individually for each pixel. Since, however, the transfer function to which the individual correction values are subjected is largely independent from the production tolerances of the individual pixels, the calculation effort can be considerably reduced by picking out one or a few pixels as examples. If a number of pixels are used for determining the transfer function, negative influences of statistical fluctuations can be reduced by averaging. Overall, the process speed of the novel method is further optimized in this refinement.

In a further refinement, the parameters are provided by means of reference data of image sensors of the same type.

In this embodiment, there is no individual determination of the transfer function or its parameters at all. Instead, the parameters of image sensors of the same type are stored at the producer's end, for example during the production of the image sensors. The resultant disadvantages, namely that the transfer function has not been determined by means of the image sensor actually present, can be reduced by an iterative repetition of the method as explained in greater detail in the text which follows, at least to the extent that the speed advantage predominates.

In a further embodiment, the parameters of a mathematical inverse function of the defined transfer function are provided in the memory.

This measure leads to further acceleration of the method since it is not the transfer function itself but its mathematical inverse which is needed for calculating the suitable correction values. The correction value calculating unit is relieved of the task of forming the inverse function by the fact that the parameters of the inverse function are already stored in the memory. Accordingly, this also reduces the hardware expenditure with respect to the correction value calculating unit.

In a further refinement, for calculating the individual correction values, the following method steps are performed at least once:

a) providing a first correction value for the image signal values of the pixels, b) recording a homogeneous reference image and reading out the associated image signal values, c) determining a uniform target image value and d) calculating the individual correction values using the image signal values of the homogeneous reference image, the uniform target image value and the parameters of the transfer function.

In this refinement, the quantities needed for determining the correction values are acquired by measurements. In particular, the existing fixed-pattern noise of the image sensor is measured here by recording the homogeneous reference image. The calculation of the individual correction values can then be restricted to performing a few mathematical operations as is explained in greater detail with reference to the illustrative embodiments in the text which follows.

In a further refinement, the first correction value is provided uniformly for all pixels.

In this refinement, the existing fixed-pattern noise of the image sensor is recorded uncorrupted during the recording of the image signal values in step b). This results in already a single execution of the novel method supplying good results during the FPN correction. Due to the possibility of executing the method iteratively, however, it is generally likewise possible to begin with different first correction values.

In a further refinement, at least method steps b) and d) are iterated.

This refinement leads to a further enhancement in the correction quality since due to the iterations, dynamic effects, particularly transient processes in the analogue signal path are considered.

In a further refinement, the uniform target image value is determined as mean value of the image signal values read out in method step b).

The target image value can be determined as arithmetic mean between the maximum and minimum image signal value of the image signal values read out in method step b). However, forming a mean value by including all image signal values read out is even more preferred. The measure has the advantage that the correction range determined by the data width of the correction values is optimally utilized and that on average, only comparatively slight corrections are required.

It goes without saying that the aforementioned features and the following features still to be explained can be used not only in the combination specified in each case but also in other combinations or by themselves without departing from the scope of the present invention.

BRIEF DESCRIPTION OF THE DRAWINGS

Illustrative embodiments of the invention are shown in the drawing and are explained in greater detail in the following description. In the figures.

DESCRIPTION OF PREFERRED EMBODIMENTS

Figure 1:
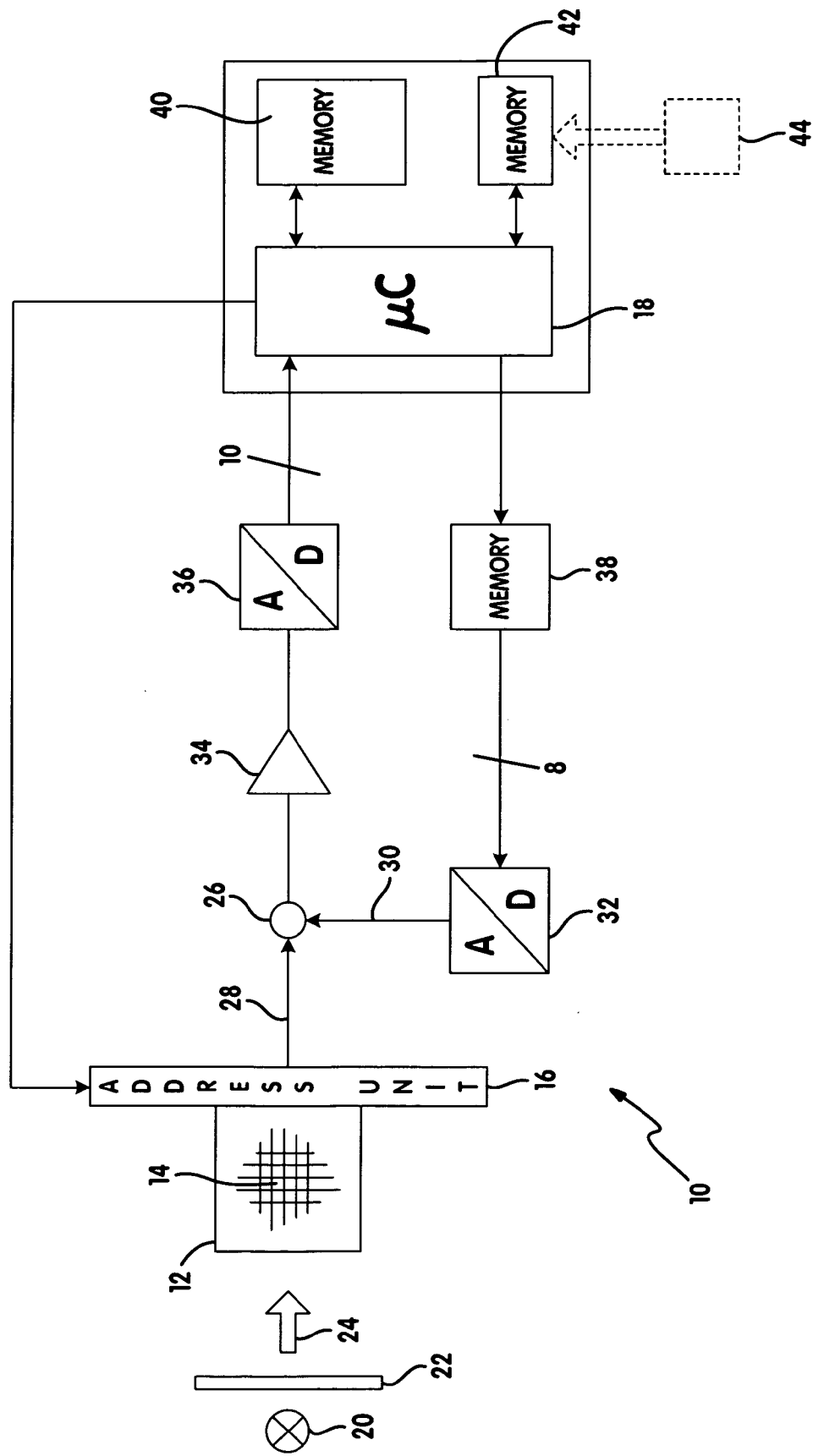
FIG. 1 shows a diagrammatic representation of an arrangement according to the invention for correcting the fixed-pattern noise in an image sensor.

In FIG. 1, an arrangement according to the invention is designated in its entirety by reference number 10.

The arrangement 10 here includes an image sensor 12, known per se, comprising a plurality of pixels 14. According to the preferred field of activity of the applicant, the image sensor is a CMOS image sensor here. However, the method can also be used, in principle, in image sensors of a different technology, for example CCD image sensors.

The reference number 16 designates an addressing unit which is controlled by a microcontroller 18. The addressing unit 16 addresses individual pixels 14 of the image sensor 12 for reading out the corresponding image signal values.

The reference number 20 designates a light source. Between the light source 20 and the image sensor 12, a diffuser 22 is arranged so that homogeneous light illuminates the image sensor 12. The homogeneous light is indicated here by an arrow having reference number 24. It represents a homogeneous reference image for performing the method described in the text which follows. As an alternative, an homogeneous illumination can also be provided, for example, with the aid of an Ulbricht-sphere or another homogeneous illumination device.

The reference number 26 designates an analogue adder, the input of which is connected to the addressing unit 16 via a signal line 28. A second input is connected to a D/A converter 32 via a signal line 30. The output of adder 26 is connected to an amplifier 34 which, according to a preferred illustrative embodiment, has a variable gain factor v. This makes it possible to optimally adapt the signal level of the image signal values read out to the operating range of an A/D converter 36 arranged at the output of the amplifier. The output of the A/D converter 36 is connected to the microcontroller 18.

The reference number 38 designates a memory, for example a flash EPROM or an SRAM. The memory 38 is also controlled by microcontroller 18. It is used for storing individual correction values which are added to the image signal values read out from the image sensor 12 for reducing or eliminating the fixed-pattern noise. Since memory 38, according to a preferred illustrative embodiment, stores the correction values in digital form, it is connected to the adder 26 via D/A converter 32.

The reference number 40 designates another memory in which the microcontroller 18 stores FPN-corrected image signal values for further processing. The reference number 42 designates a further memory which, according to the illustrative embodiment preferred here, is used for storing parameters of the transfer function according to which the correction values from the memory 38 are influenced during the signal processing in this case. Essentially, the transfer function here corresponds to the transfer characteristic of the D/A converter 32. The memory 42 can also be a register of the microcontroller 18 in a preferred illustrative embodiment.

The reference number 44 designates an external unit, only indicated diagrammatically in this case, from which the parameters of the transfer function can be loaded into memory 42. In an illustrative embodiment of the invention, this is done during the production of the device 10.

For the sake of completeness, it should be mentioned that the components shown here can be integrated in a single microchip with the exception of the light source 20 and the diffuser 22. As an alternative, some or more of the components shown can also be implemented separately from the image sensor 12. In some applications, the microcontroller 18 is a computer which is independent of the image sensor 12, for example a PC, in which the image signal values are processed and the correction values are calculated.

Figure 2:
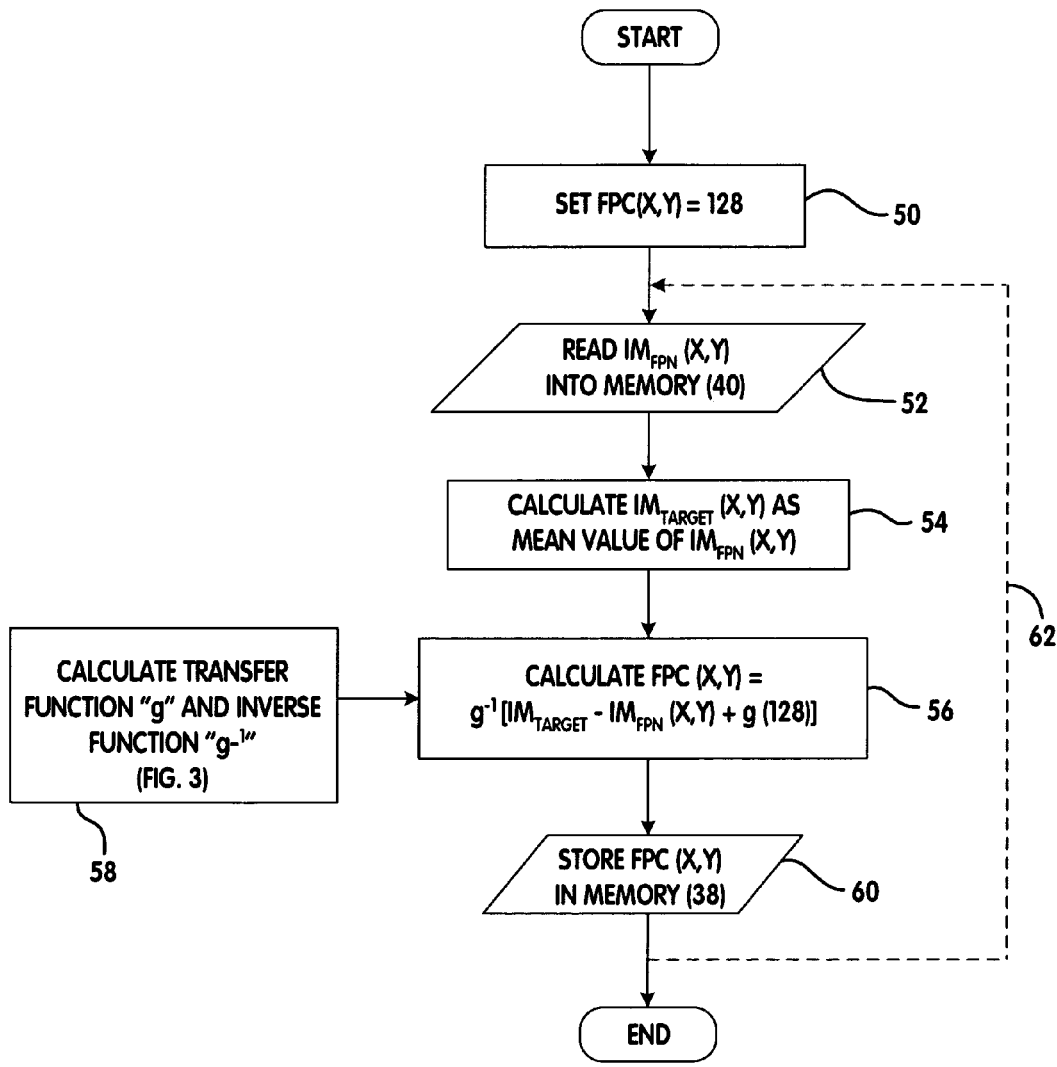
FIG. 2 shows a flowchart for explaining the method according to the invention.

FIG. 2 shows a preferred illustrative embodiment of the method according to the invention by means of a flowchart.

At the beginning of the method, a uniform correction value FPC(x,y)=128 is first set for all pixels in method step 50. The correction value FPC=128 corresponds to a correction with 0 since 128 approximately represents the symmetric mean value for a correction value width of 8 bits (=256 correction values) used here. Correction values of less than 128 lead to negative analogue quantities in the D/A converter 32 so that in this case, a correction value is subtracted from the associated image signal value. Correction values of greater than 128 lead to positive analogue quantities which results in an addition in the actual mathematical sense.

In method step 52, the image signal values $IM_{FPN}(x,y)$ of the pixels 14 are read into the memory 40. The variables x and y designate the row and column position of the individual pixels 14 on the image sensor 12. Since the image signal values of the pixels 14 in this case are not corrected with individual correction values during the reading-in, the image signal values $IM_{FPN}(x,y)$ reflect the fixed-pattern noise of the image sensor 12.

In method step 54, a uniform target image value $IM_{target}$ is determined as mean value of all image signal values $IM_{FPN}(x,y)$. According to a preferred illustrative embodiment, the image signal values of all pixels 14 are used for forming the mean value. As an alternative a representative selection of a number of pixels 14 can also be used which are arranged distributed over the entire image area of the image sensor 12.

In method step 56, the individual correction values FPC (x,y) are calculated for the individual pixels 14 in accordance with the following formula:

$$FPC(x,y)=g^{-1}[IM_{target}-IM_{FPN}(x,y)+g(128)]$$

where:
FPC (x,y) are the individual correction values,
$IM_{target}$ is the uniform target image value,
$IM_{FPN}(x,y)$ are the image signal values read in,
$g^{-1}$ is the inverse function of the transfer function g to which the correction values FPC (x,y) are subject on their way from the memory 38 to the microcontroller 18, and
g(128) is the function value of the transfer function g for the correction value 128.

The inverse function $g^{-1}$ of the transfer function is in this case determined separately in a block 58. Parameters of the inverse function are then stored in memory 42 of the arrangement 10 in accordance with a preferred illustrative embodiment of the invention. As an alternative and/or supplement, it is also possible to store the inverse function $g^{-1}$ or the transfer function g, respectively, as a functional mathematical rule in the microcontroller 18. The microcontroller 18 acts as correction value calculating unit in this case.

In method step 60, each calculated individual correction value FPC (x,y) is stored in memory 38.

According to loop 62, the method steps 52 to 60 can be executed iteratively, as a result of which the calculated correction values are further optimized. Even without these iterations, however, the novel method already achieves the same quality of correction value as the method described initially and used hitherto. Step 54 can be bypassed during the iteration if the target image value $IM_{target}$ from the first iteration is still used. The same applies to the determination of the parameters of the transfer function g or of its inverse function $g^{-1}$, respectively, according to step 58.

In another preferred illustrative embodiment, the transfer function which, in particular, is determined by the characteristic of the D/A converter 32, is approximated by a straight line. In this case, the slope m of the approximation line is sufficient as parameter of the transfer function. The correction values FPC (x,y) are here calculated in accordance with the following formula, where indices for multiple iterations are also added:

$$FPC_{n+1}(x,y)=FPC_n+1/m\,[IM_{target}-IM_{FPN,n}(x,y)]$$

where:
$FPC_{n+1}(x,y)$ are the calculated correction values in iteration n+1,
$IM_{target}$ is the uniform target video value,
$IM_{FPN}(x,y)$ are the image signal values read in,
m is the slope of the approximation line of the transfer function g and
n is the number of iterations.

As a starting value, $FPC_0=128$ is preferably used for a correction value width of 8 bits.

Figure 3:
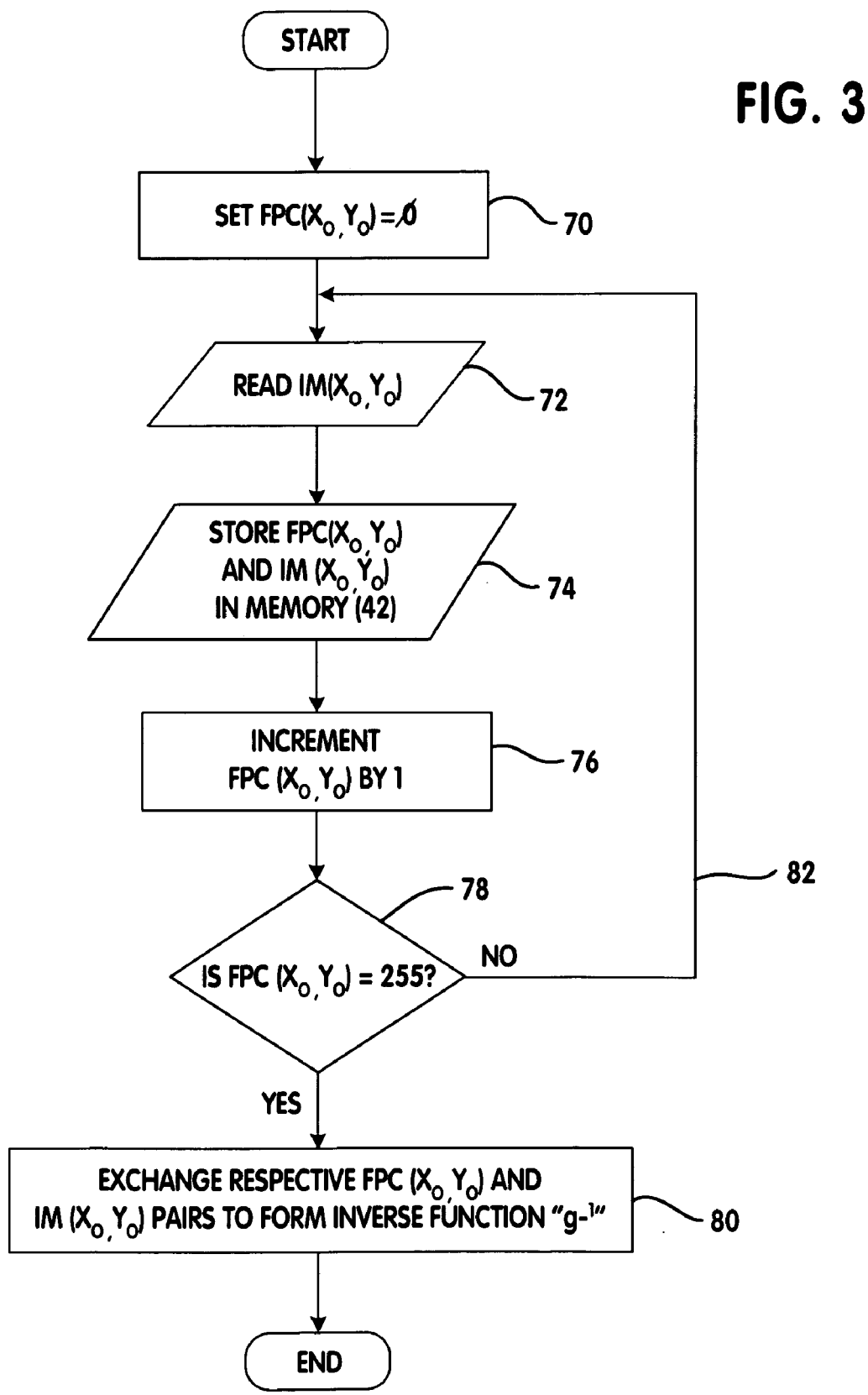
FIG. 3 shows a further flowchart for explaining by way of example how the transfer function can be determined.

FIG. 3 shows a preferred illustrative embodiment for determining the transfer function g or its inverse function $g^{-1}$, respectively, by means of a further flowchart. The transfer function g is measured in this case by running through all correction values once and recording the associated function values.

In method step 70, the correction value of a selected pixel having the coordinates $x_0,y_0$ is first set to the lowest value FPC $(x_0,y_0)=0$ (negative correction value). The associated image signal value IM $(x_0,y_0)$ is then read in by the microcontroller 18 according to step 72. If the image sensor 12 is completely blacked out during this process, the smallest possible corrected image signal value is obtained. If the image sensor 12 is homogeneously illuminated, an additional additive constant is obtained which, however, can be easily corrected mathematically. The additive constant is reflected in the term "g(128)" in the general calculation formula specified above.

In step 74, the pair of values determined in steps 70 and 72 is stored in memory 42 of the arrangement 10. In step 76, the correction value FPC $(x_0,y_0)$ is incremented in steps of 1. According to step 78, there is an interrogation then whether the maximum correction value FPC $(x_0,y_0)=255$ (for a correction value width of 8 bits) has been reached or not. If it has, all pairs of values of the transfer function are stored in memory 42. To form the inverse function, it is then sufficient to exchange the respective pairs of coordinates obtained. According to step 80, this provides the inverse function $g^{-1}$ of the transfer function g.

If the maximum correction value has not yet been reached, a new loop iteration occurs according to loop 82.

In an illustrative embodiment which is also preferred, an approximation line is used for determining the transfer function g or its inverse function $g^{-1}$, respectively. In this case, it is sufficient to read in two pairs of values of the transfer function in the manner described by means of FIG. 3. Following this, the slope m of the approximation line is determined by forming difference and quotient in a manner known per se. For a correction value width of 8 bits, the function values for the correction values 178 (=128+50) and 78 (=128−50) are preferably recorded since this leads to an approximation line which is a very good approximation of the transfer function. As a result, the transfer function is linearized about its symmetric zero point.

The more precisely the slope m of the transfer function is known in the area of the linearization, the quicker the method described in FIG. 2 will reach the optimum correction values. With the values specified, it was possible to achieve correction values corresponding to the conventional method already in the first iteration step. Very good results were achieved after only two iteration steps.

In preferred modifications of the illustrative embodiments described, the transfer function or its inverse function, respectively, is determined by means of the image signal values from a number of pixels. Furthermore, instead of a single image signal value per pixel, a number of image signal values per pixel can be recorded successively, for example 16. Their temporal mean value is then used for determining the transfer function or its inverse function, respectively. This eliminates statistical fluctuations of the image signal values over time. In a preferred modification of the illustrative embodiment shown by means of FIG. 2, temporal averaging is also performed in steps 52 and 56 and possibly also 54.

If the transfer function, particularly the slope m, is determined for each image sensor 12 and at the beginning of each recording, the influence of the variable amplifier 34 on the FPN correction is eliminated. This provides a constantly optimum image quality.

What is claimed is:

1. A method for reducing fixed pattern noise in image signals of a digital image sensor having a plurality of pixels, with the pixels each producing an analogue image signal, the method comprising the steps of:
   reading an analogue image signal value from at least one pixel,
   providing a digital correction value for correcting the analogue image signal value,
   converting the digital correction value into an analogue correction value,
   adding the analogue correction value to the analogue image signal value via a signal path having a defined transfer function in order to produce a corrected analogue image value, and
   converting the corrected analogue image value into a corrected digital image value,
   wherein parameters which are characteristic of the defined transfer function are provided in a memory, and
   wherein the digital correction value is calculated on the basis of the parameters.

2. The method of claim 1, wherein the digital correction value is calculated by means of:
   a) providing a first digital correction value,
   b) recording a homogeneous reference image and reading out the analogue image signal value associated with the homogeneous reference image,
   c) determining a target image value, and
   d) calculating the individual digital correction value using the image signal value read out in step b), the target image value and the parameters of the transfer function.

3. The method according to claim 2, wherein the first digital correction value is provided uniformly for each pixel from the plurality of pixels.

4. The method of claim 2, wherein the target image value is determined as a mean value of the image signal values from the plurality of pixels.

5. A method for correcting fixed pattern noise using an image sensor arrangement having an image sensor with a plurality of pixels for providing a plurality of image signal values, having an adder for adding individual correction values to the image signal values, and having a memory, comprising the following steps:
   reading the image signal values from the pixels, and
   adding the individual correction values to the image signal values,
   wherein the individual correction values are added to the image signal values as analogue quantities via a signal path having a defined transfer function,
   wherein parameters which are characteristic of the defined transfer function are provided in the memory, and
   wherein the individual correction values are calculated using the parameters provided.

6. The method of claim 5, further comprising
   providing a set of possible correction values,
   recording a first image signal value,
   adding at least two different correction values from the set of possible correction values to the first image signal value for producing at least two corrected image signal values, and
   estimating the parameters of the defined transfer function on the basis of the first image signal value and the at least two corrected image signal values.

7. The method of claim 6, wherein all correction values from the set of possible correction values are added to the first image signal value for producing corrected image signal values.

8. The method of claim 5, wherein the parameters are determined on the basis of selected pixels.

9. The method of claim 8, the parameters are determined on the basis of a single pixel.

10. The method of claim 5, wherein the parameters are provided by means of reference data from image sensors of the same type.

11. The method of claim 5, wherein the parameters are provided as parameters of a mathematical inverse function of the defined transfer function.

12. The method of claim 5, further comprising the steps of:
   a) providing a first correction value for the plurality of image signal values,
   b) recording a homogeneous reference image and reading out the plurality of image signal values associated with the homogeneous reference image,
   c) determining a uniform target image value, and
   d) calculating the individual correction values using the image signal values associated with the homogeneous reference image, the uniform target image value and the parameters of the transfer function.

13. The method of claim 12, wherein the first correction value is provided uniformly for all pixels.

14. The method of claim 12, wherein at least method steps b) and d) are iterated.

15. The method of claim 12, wherein the uniform target image value is determined as a mean value of the image signal values read out in method step b).

16. A system for reducing fixed pattern noise in image signals of a digital image sensor having a plurality of pixels, with the pixels each producing an analogue image signal, the system comprising a device for reading the image signal values from the pixels, comprising a first memory for storing individual correction values, and comprising an adder for analogue addition of the individual correction values to the image signal values, the first memory and the adder being connected via a signal path having a defined transfer func tion, further comprising a second memory and a correction value calculating unit, wherein the second memory is configured to provide parameters which are characteristic of the defined transfer function, and wherein the correction value calculating unit is configured to calculate the individual correction values using the parameters provided.

* * * * *